June 14, 1955  L. W. SCHMIDT  2,710,513
BEET TOPPING AND CLOD BREAKING UNIT FOR BEET HARVESTERS
Filed March 8, 1952  3 Sheets-Sheet 1

INVENTOR
L. W. Schmidt
BY
ATTYS

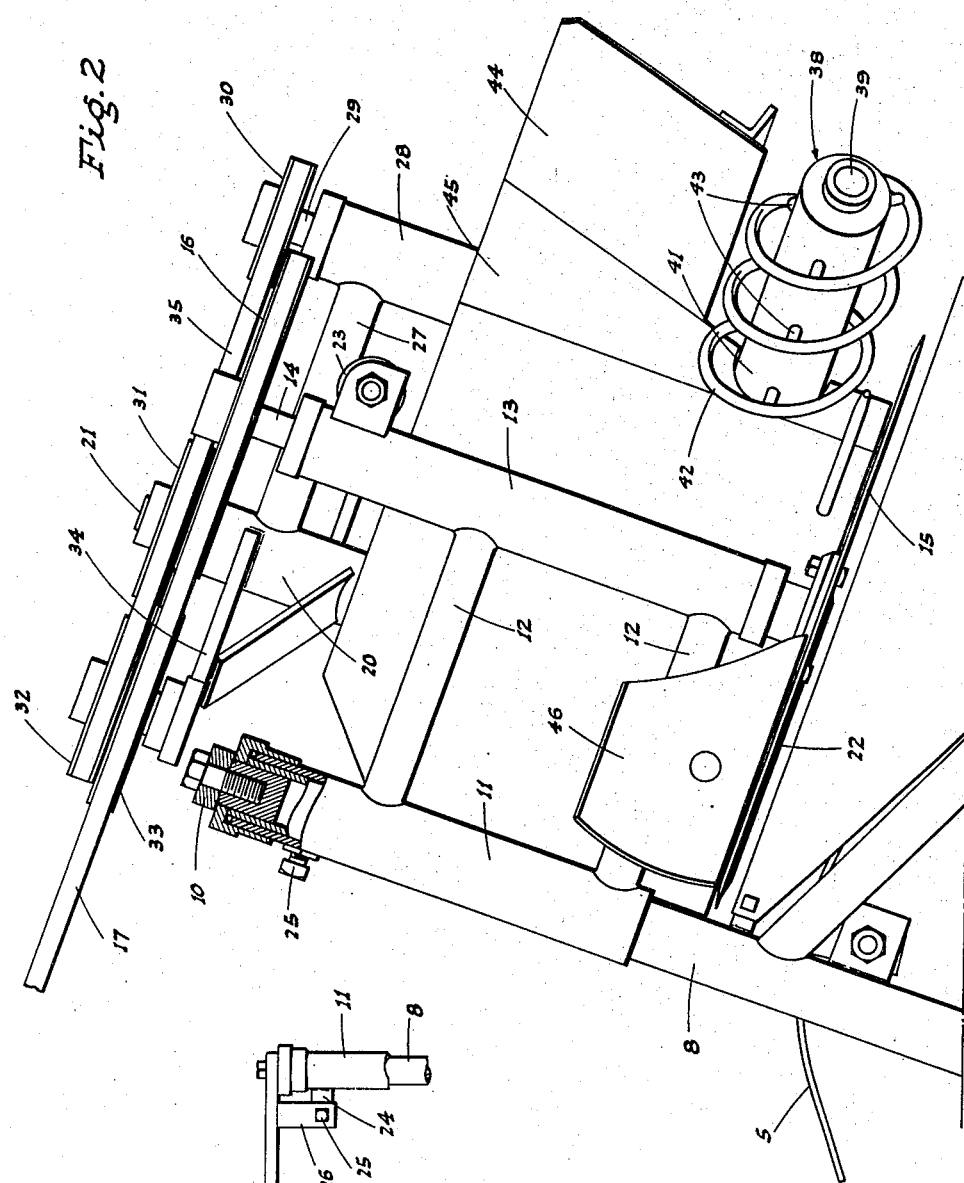
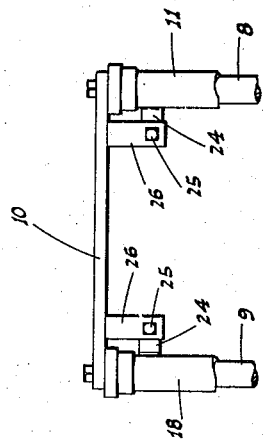

United States Patent Office 2,710,513
Patented June 14, 1955

2,710,513

BEET TOPPING AND CLOD BREAKING UNIT FOR BEET HARVESTERS

Lewis Wallace Schmidt, Rio Vista, Calif.

Application March 8, 1952, Serial No. 275,588

9 Claims. (Cl. 55—106)

This invention relates to a beet harvester, and particularly to one of the type shown in my Patent No. 2,535,960, dated December 26, 1950.

Such harvester includes a spiked beet pick-up wheel, a cutting unit cooperating with the wheel to sever the beets from their tops, and means cooperating with the cutting unit to deliver the beets to a longitudinal conveyor which is disposed in laterally offset relation to the wheel, and which requires the beets to be shifted laterally from the cut-off zone in order for them to reach the conveyor.

The present invention comprises improvements over the structure of said patent, particularly with respect to the means to transfer the cut beets from the cutting zone to the longitudinal conveyor.

In the arrangement for this purpose shown in the patent, there was a tendency for the topped beets to become piled up on the cutting disc rather than being freely delivered to the conveyor. Also, clods of dirt with the beets were frequently delivered to the conveyor with the beets.

A major object of this invention therefore is to provide an improved beet feed or transfer device, which not only gives an even flow of the topped beets from the cutting zone to the conveyor, but also breaks up any dirt clods and causes the same to be discharged onto a carry-off conveyor.

Another object of the invention is to provide an improved cutting unit, comprising cooperating cutting discs as before, but which are now arranged for lateral yielding to avoid damage in the event that a rigid object, such as a wedged stone or the like, is brought to the cutting zone by the spiked wheel.

It is also an object of the invention to provide a beet feeding and clod breaking unit for beet harvesters which is designed for ease and economy of manufacture.

Still another object of the invention is to provide a practical, reliable, and durable beet feeding and clod breaking unit for beet harvesters, and one which will be exceedingly effective for the purpose for which it is designed.

These objects are accomplished by means of such structure and relative arrangement of parts as will fully appear by a perusal of the following specification and claims.

In the drawings:

Fig. 2 is an enlarged side elevation of the unit, detached.

Fig. 5 is a fragmentary rear end view of the post unit.

Figure 1:
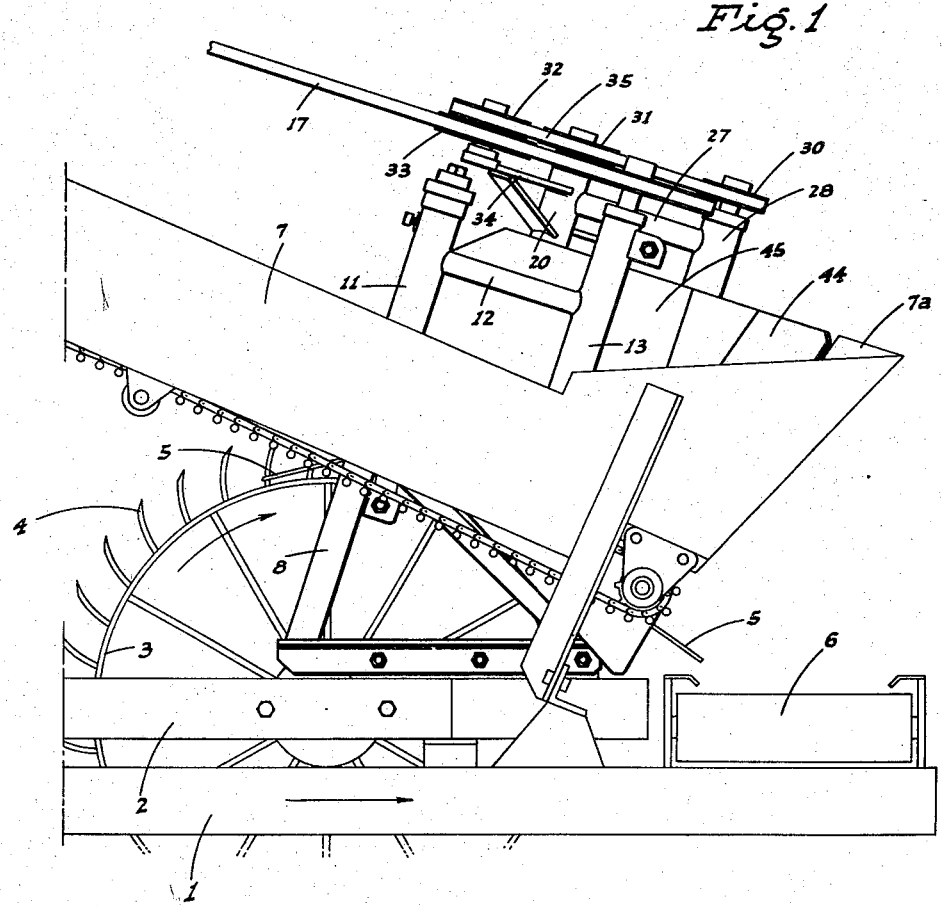
Fig. 1 is a fragmentary side elevation of a beet harvester as equipped with my improved beet feeding unit.

Referring now more particularly to the characters of reference on the drawings, the beet harvester in which the improved unit is incorporated includes essentially, aside from the beet cutting and conveyor feeding mechanism with which the present invention deals, a tractor-supported main frame 1, a secondary or sub-frame 2 above and mounted on the main frame for limited vertical floating movement, a beet pick-up wheel 3 journaled in the sub-frame and having peripheral spikes 4 to impale the beets and lift the same from the ground for cutting or topping by said mechanism at the top of the wheel, a stripping unit 5 which strips the cut beet tops from the spikes and delivers them onto the ground discharging cross conveyor 6 on the front end of the main frame, and a longitudinal beet-receiving conveyor 7 mounted on the main frame and extending upwardly and rearwardly and disposed to one side of the pick-up wheel. Except for said beet cutting and conveyor feeding mechanism, all these features are generally the same as shown in detail in the aforementioned patent, and in themselves form no part of the present invention; such mechanism comprising the following:

Supported from the sub-frame on opposite sides of wheel 3 in straddling relation thereto are upstanding posts 8 and 9 tied together on top by a cross bar 10.

Turnable on post 8, which is on the side nearest conveyor 7, is a sleeve 11 from which radial, vertically spaced arms 12 project forwardly. These arms at their forward end support a sleeve 13 parallel to sleeve 11 and in which a shaft 14 is turnable. The shaft on its lower end carries a main topping disc 15 disposed close to but above the wheel spikes 4 and overhanging the upper run of conveyor 7 somewhat, as in Patent No. 2,535,960. On its upper end, shaft 14 carries a pulley 16 which is engaged and driven by a rearwardly extending endless belt 17.

Turnable on post 9 is a sleeve 18 from which radial arms 19 extend forwardly to support a sleeve 20 parallel to sleeve 18 and in which a shaft 21 is journaled. On its lower end shaft 21 carries a cutting disc 22 cooperating with disc 15 under the same and of relatively small size. The two discs 15 and 22 lie symmetrical over wheel 3 so that both discs act on each beet as elevated by the rotating wheel, cutting the beets from the impaled tops.

Sleeves 20 and 13 are tied together by an adjustable tension spring 23 tending to pull said sleeves toward each other, such tendency being limited by stop lugs 24 on sleeves 11 and 18 engaged by adjustable screws 25 mounted in plates 26 depending from cross bar 10 (see Fig. 5). In this manner, the overlap of the discs may be altered, and said discs may yieldably separate if a relatively unyielding object should come between the discs.

Projecting forwardly from sleeve 20 are arms 27 which, on their forward end, support a sleeve 28 parallel to sleeve 20 and in which a shaft 29 is journaled, a pulley 30 being fixed on the upper end of said shaft.

Figure 3:
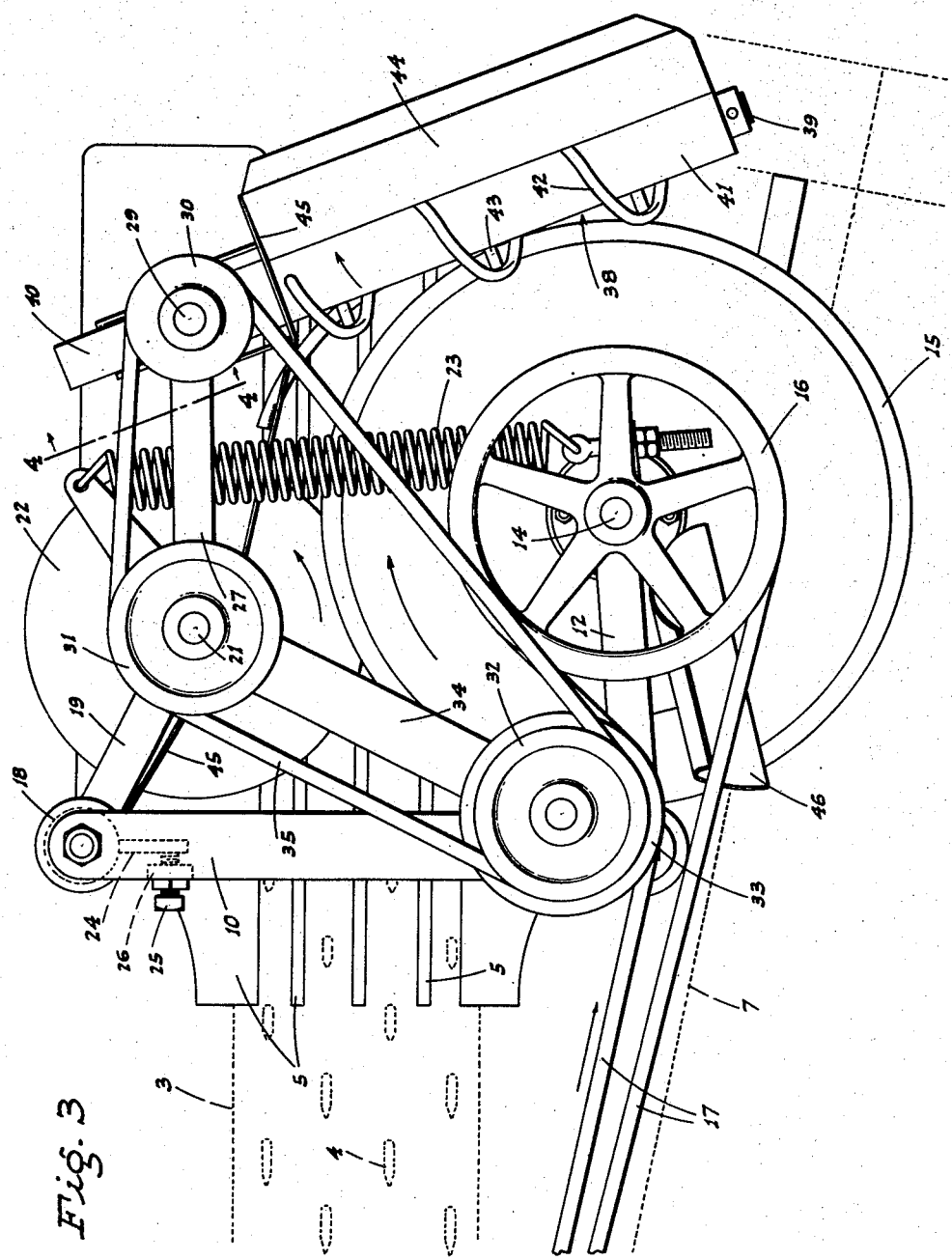
Fig. 3 is an enlarged plan view of such unit.

A pulley 31 is fixed on the upper end of shaft 21, while a double pulley unit comprising an upper pulley 32 and a lower pulley 33 in the plane of pulley 16, is disposed so that pulley 33 is engaged by the laterally inward forwardly moving run of belt 17, as shown in Fig. 3. The pulley unit is mounted on an arm 34 projecting from sleeve 20, as shown in Fig. 2.

Pulleys 30, 31 and 32 lie in a common plane, and are all engaged by an endless belt 35. In this manner the two disc shafts, as well as shaft 29, are driven from a single drive belt and in such a manner that the discs are driven in opposite directions.

Figure 4:
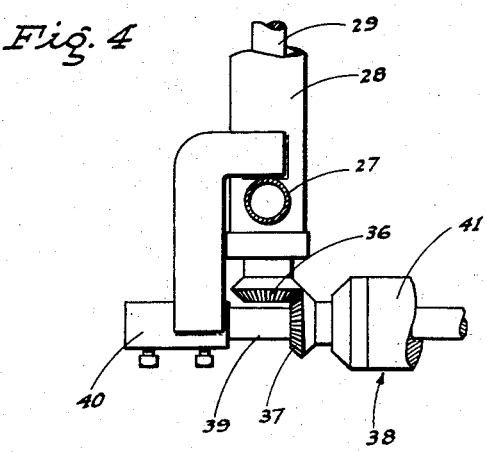
Fig. 4 is a fragmentary transverse section on line 4—4 of Fig. 3.

Shaft 29 on its lower end carries a bevel gear 36 meshing with a bevel gear 37 fixed on the adjacent end of an auger unit 38. This unit is turnable on a transversely horizontal shaft 39 fixed at one end in a sleeve 40 fixed with the lower end of sleeve 28, as shown in Fig. 4.

Shaft 39 and the auger unit extend across the disc 15 at the forward end thereof, as shown in Fig. 3, and a short distance above the same, as shown in Fig. 2. Also, the auger is disposed in plan at an acute angle to the conveyor 6.

The auger unit comprises a drum 41 about which a spirally wound rod 42 is disposed in clearance relation to the drum, being supported therefrom by spaced lugs 43. The spiral is wound relative to the direction of rotation of the auger so as to convey the topped beets resting on disc 15 in the direction of the conveyor, the forward side of disc 15 moving in the same general direction.

An auger constructed in this manner—instead of with the usual solid plate type spiral—not only feeds the beets toward the conveyor, but breaks up any clods coming in contact therewith, so that the broken-up clods pass under the auger and fall onto the conveyor 6, instead of being carried onto the conveyor 7.

A retaining plate 44 extends upwardly from the auger lengthwise thereof and alines at its outer end with the end plate 7a of conveyor 7 (see Fig. 1), as well as with an upstanding plate 45 which extends from the laterally inner end of plate 44 to sleeve 18 in overhanging relation to disc 22 in front of sleeves 28 and 20.

The direction of rotation of the disc and its speed (above 300 R. P. M.) tends to cause the beets to be thrown against the auger, and this tendency is aided by the downward slope of the discs in the direction of the auger.

However, to assure that any beets initially on the rotating disc 15 do not remain thereon, a deflecting plate 46 is fixed on the lower arm and is disposed laterally out therefrom in relatively sweeping relation to said disc in position to divert any number of beets thereon and cause the same to be swept from the disc and onto the conveyor.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A beet topping unit for a beet harvester comprising a pair of parallel-axis cooperating driven cutting discs overlapping each other with their axes laterally spaced and in position to cut across and through harvested beets passing closely under the discs, means to mount the discs on the harvester for relative separation laterally while maintaining the parallel relationship of the axes of the discs, and spring means to yieldably resist such separation; said mounting means including upstanding posts adapted to be fixed on the harvester, sleeves turnable on the posts, an arm rigid with and projecting from each sleeve, other sleeves to which the arms at their outer end are connected, and shafts supported in said other sleeves, the discs being at the lower end of the other sleeves and fixed on the corresponding shafts.

2. A unit, as in claim 1, in which the spring means comprises a tension spring connected between said other sleeves, and adjustable stop means between the first named sleeves and posts to limit the rotation of said sleeves in a spring-pulled direction.

3. A beet topping unit for a beet harvester comprising a pair of cooperating driven cutting discs overlapping each other in position to cut across and through harvested beets passing closely under the discs, means to mount the discs on the harvester, and means to drive the discs in opposite directions comprising a pulley fixed axially with one disc, an endless driven belt extending lengthwise of the harvester from said pulley, a second pulley fixed axially with the other disc, a third pulley positioned to be engaged by the outer face of one run of the belt and rotated in a direction opposite that imparted by the belt to the first pulley, a fourth pulley fixed as a unit with the third pulley, and an endless belt extending between the second and fourth pulleys.

4. In a beet harvester having a driven conveyor arranged at its forward end to receive topped beets, means to elevate untopped beets and dispose them in an inverted position at a level above that of the conveyor, and a driven rotary topping disc overlapping the conveyor and positioned to top the inverted beets, said disc supporting the beets as topped and rotating in a direction such that the peripheral portion thereof which overlaps the conveyor moves in the same direction as said conveyor; a driven feed auger disposed a short distance above the disc at its forward end and extending transversely of the conveyor in angular relation thereto to deflect beets from the disc laterally in the direction of the conveyor.

5. A structure, as in claim 4, with a retaining-plate unit extending lengthwise of and above the auger and then lengthwise from the end of the auger opposite the conveyor in a lateral plane beyond the corresponding side of the disc.

6. In a beet harvester having a conveyor arranged to receive topped beets, means to elevate untopped beets and dispose them in an inverted position at a level above that of the conveyor, and a driven rotary topping disc positioned to top the inverted beets; the beets as topped being supported by the rotary disc, said disc having a peripheral portion in a plane above and in such relation to the conveyor that beets discharged from the disc at said peripheral portion deliver onto the conveyor, and a driven feed auger above the disc disposed to deflect the disc-supported beets to cause the same to discharge from said peripheral portion.

7. A structure, as in claim 6, in which said disc rotates in the direction of feed of the auger.

8. A structure, as in claim 6, in which the auger comprises a central drum, a spirally wound rod about the drum in spaced relation thereto, and elements extending between the rod and drum at intervals and connected thereto to tie the rod to the drum.

9. A structure, as in claim 6, in which the disc is disposed with a downward slope toward the auger.

References Cited in the file of this patent

UNITED STATES PATENTS

| | | |
|---|---|---|
| 1,300,362 | Faucher | Apr. 15, 1919 |
| 1,775,149 | Urschel | Sept. 9, 1930 |
| 2,535,960 | Schmidt | Dec. 26, 1950 |
| 2,582,945 | Bingham et al. | Jan. 22, 1952 |
| 2,589,361 | Floeter et al. | Mar. 18, 1952 |